(12) United States Patent
Peng et al.

(10) Patent No.: US 9,946,532 B2
(45) Date of Patent: Apr. 17, 2018

(54) APPARATUS, SYSTEM AND METHOD FOR UPDATING A PERIPHERAL CONNECTED TO IMAGE PROCESSING DEVICE

(71) Applicants: Canon Information and Imaging Solutions, Inc., Melville, NY (US); Canon U.S.A. Inc., Melville, NY (US)

(72) Inventors: Jiayin Peng, College Point, NY (US); Jiuyuan Ge, Centereach, NY (US); Song Cang, Jerricho, NY (US); Bryan Heller, Northport, NY (US)

(73) Assignees: CANON INFORMATION AND IMAGING SOLUTIONS, INC., Melville, NY (US); CANON U.S.A., INC., Melville, NY (US)

( * ) Notice: Subject to any disclaimer, the term of this patent is extended or adjusted under 35 U.S.C. 154(b) by 0 days.

(21) Appl. No.: 15/183,518

(22) Filed: Jun. 15, 2016

(65) Prior Publication Data
US 2017/0364346 A1 Dec. 21, 2017

(51) Int. Cl.
| | |
|---|---|
| G06F 9/445 | (2006.01) |
| G06F 13/42 | (2006.01) |
| G06F 17/30 | (2006.01) |
| G06F 3/0482 | (2013.01) |
| G06F 9/44 | (2006.01) |
| G06F 13/10 | (2006.01) |
| G06F 13/40 | (2006.01) |

(52) U.S. Cl.
CPC .............. *G06F 8/65* (2013.01); *G06F 3/0482* (2013.01); *G06F 13/102* (2013.01); *G06F 13/4068* (2013.01); *G06F 13/4282* (2013.01); *G06F 17/30569* (2013.01); *G06F 2213/0042* (2013.01)

(58) Field of Classification Search
CPC .... G06F 8/65; G06F 3/0482; G06F 17/30569; G06F 13/102; G06F 13/4068; G06F 13/4282; G06F 2213/0042
USPC ......................................................... 717/172
See application file for complete search history.

(56) References Cited

U.S. PATENT DOCUMENTS

| | | | | |
|---|---|---|---|---|
| 8,868,796 B1* | 10/2014 | Wojcik | ...................... | G06F 8/71 710/11 |
| 2003/0005272 A1* | 1/2003 | Nalawadi | .............. | G06F 13/385 713/1 |
| 2003/0088868 A1* | 5/2003 | Chang | ...................... | G06F 8/65 717/173 |

(Continued)

*Primary Examiner* — Ryan D. Coyer
(74) *Attorney, Agent, or Firm* — Canon USA Inc., IP Division

(57) ABSTRACT

An image processing device and control method that includes a processor and a memory storing a set of instructions that, when executed by the processor, controls the image processing device to receive a first data object representing a software update to be applied to the at least one peripheral device coupled to the image processing device. A communication mode switch message is generated to change a mode of communicating data between the at least one peripheral device and the image processing device and communicate the communication mode switch message to the at least one peripheral device. Currently active communication mode is disabled and a previously disabled communication pathway of the at least one peripheral device is activated as an update mode. The data representing the software update is transmitted via the update mode to apply the software update to the at least one peripheral device.

21 Claims, 9 Drawing Sheets

(56) References Cited

U.S. PATENT DOCUMENTS

| | | | | |
|---|---|---|---|---|
| 2009/0064125 A1* | 3/2009 | Venkatachalam | ......... | G06F 8/65 |
| | | | | 717/170 |
| 2011/0093839 A1* | 4/2011 | Murase | ..................... | G06F 8/68 |
| | | | | 717/168 |
| 2015/0029546 A1* | 1/2015 | Nishizaki | ................... | G06F 8/65 |
| | | | | 358/1.15 |
| 2016/0182610 A1* | 6/2016 | Satoh | ....................... | H04L 67/06 |
| | | | | 709/219 |
| 2017/0091771 A1* | 3/2017 | Kaibara | ............... | G06Q 20/127 |

* cited by examiner

APPARATUS, SYSTEM AND METHOD FOR UPDATING A PERIPHERAL CONNECTED TO IMAGE PROCESSING DEVICE

BACKGROUND OF THE INVENTION

Field of the Invention

The present invention relates generally to image processing devices and, more particularly to updating a peripheral connected to an image processing device.

Description of the Related Art

Image processing devices are routinely deployed for both personal and commercial uses. Image processing devices may provide functionality for making photocopies, printing a document, scanning a document and generating an electronic document representing the scanned document, transmitting data over a network, accessing a database on a remote server, or other tasks. These devices are generally provided and shared among many different users in an office environment. These devices are also known as multifunctional peripheral (MFP) devices due to the ability of the device to perform multiple operations.

In certain instances, the image processing device may include one or more peripheral devices that are connected to the image processing device via a wired or wireless connection mechanism. Examples of wired connections include those using serial communication protocol, the parallel port communication protocol and universal serial bus. Examples of wireless communication mechanisms include long-range wireless communication protocols such as Wi-Fi as well as short range communication protocols such as Bluetooth® or the like. Individual peripheral devices may operate to provide a user of the image processing device with additional functionality. The additional functionality may allow the user to interact with software executing on the image processing device to complete one or more tasks using the image processing device. These peripherals may be individually controlled and made operable by firmware stored in a read only memory of the peripheral. In other instances, these peripherals may be selectively controlled by application level software loaded into random access memory by the firmware.

A problem exists when a peripheral device connected to the image processing device requires an update to one of firmware or application level software used in controlling one or more functions of the peripheral and/or enabling interaction between the peripheral and the image processing device. Conventionally, these peripheral devices may need to be disconnected from the image processing device and be connected to an update computing device such as a personal computer. Only then can any firmware or application level software update be uploaded and applied to the peripheral hardware. Once complete, the updated peripheral device may be re-connected to the image processing device and continue to operate with the image processing device with any updated capabilities. This problem is exacerbated when a user (or other entity) has a plurality of image processing devices deployed as part of an image processing device fleet where at least some, if not all, image processing devices includes one or more peripherals in need of updates. To complete the conventional update process, each image processing device would need to be visited by a technician to disconnect the peripheral in need of update, perform the update and reconnect the updated peripheral. In addition to the significant time needed to manually provide updates to each peripheral connected to respective image processing devices, there exists noted decrease in productivity because at any given time image processing device assets may be unavailable. There exists a need to provide peripheral update application that remedies the deficiencies associated with the conventional update process. A system and method according to invention principles remedies the drawbacks described above.

BRIEF SUMMARY OF THE INVENTION

Methods, systems, and computer-readable media for updating a peripheral device coupled to an image processing device are disclosed.

In one embodiment, an image processing device having at least one peripheral device connected thereto is disclosed. The image processing device includes one or more processors and a memory storing an application which control the image processing device to receive a first data object representing a software update to be applied to the at least one peripheral device. The application generates and communicates a communication mode switch message to the at least one peripheral device causing the at least one peripheral device to activate a previously disabled communication mode and disable a currently active communication mode and communicating data representing the software update in a format associated with the activated communication mode and applying the software update to the peripheral device.

In another embodiment, An image processing device is provided which includes a processor and a memory storing a set of instructions that, when executed by the processor, controls the image processing device to perform an update control procedure. Execution of the instructions controls the image processing device to receive a first data object representing a software update to be applied to the at least one peripheral device coupled to the image processing device and generate a communication mode switch message to change a mode of communicating data between the at least one peripheral device and the image processing device. The communication mode switch message is communicated to the at least one peripheral device which disables a currently active communication mode and activates a previously disabled communication pathway of the at least one peripheral device as an update mode. The data representing the software update is transmitted via the update mode to apply the software update to the at least one peripheral device.

In another embodiment, the image processing device is controlled to determine a type of communication mode currently set as active and which is used to communicate data between the at least one peripheral device and image processing device and generate the communication mode switch message when it is determined that currently set communication mode is not of a type able to communicate data representing a software update to the at least one peripheral device.

In another embodiment, the image processing device is controlled to determine, from the at least one peripheral, types of communication modes available in the at least one peripheral and an activity status of the types of communication modes and select, as an update mode, a type of communication mode determined to be available but inactive and able to receive data representing the software update. The communication mode switch message to switch to the selected type of communication mode is then generated.

In a further embodiment, the image processing device is controlled to convert the received data object representing the software update into a format corresponding to a format suitable for transmission to the at least one peripheral device to apply the update.

In yet another embodiment, the image processing device is controlled to generate an update message indicating that an update to software executing on the at least one peripheral device is to be updated, the update message indicating a type of format that the data representing the software update will be received. The at least one peripheral is controlled to enter an update mode to apply the update based on the type of format.

In yet a further embodiment, the image processing device is controlled to generate a user interface including a plurality of user selectable image elements that enable a user to at least one of (a) upload, to the image processing device, the software update; (b) select a respective one of the at least one peripheral device connected to the image processing device to be updated and provide the generated user interface to an external computing device.

In another embodiment, the image processing device searches a network that the image processing device is connected to for one or more other image processing device and obtain from each of the one or more other image processing device on the network, information including address information identifying an address on the network and peripheral information identifying one or more peripheral devices connected to each of the one or more other image processing device. An update list is generated including the information associated with each of the one or more other image processing device and the data object representing the software update is transmitted to each of the one or more image processing devices to update the one or more peripheral devices connected thereto.

In yet another embodiment, the image processing device search a network that the image processing device is connected to for one or more other image processing device and obtains from each of the one or more other image processing device on the network, information indicating a presence of a predetermined type of application executing on each of the one or more image processing device. In response to determining that the predetermined type of application is present, the image processing device designates the predetermined type of application as a slave application and in response to determining that the predetermined type of application is not present, the predetermined type of application is caused to be installed thereon. Further, the image processing device transmits to the slave application, data representing the software update; and controls the slave application executing on each of the one or more image processing device as a slave image processing device to apply a software update to the at least one peripheral connected to the slave image processing device. The update occurs by generating a communication mode switch message to change a mode of communicating data between the at least one peripheral device and the slave image processing device and communicating the communication mode switch message to the at least one peripheral device. A currently active communication mode is disabled and a previously disabled communication pathway of the at least one peripheral device is activated as an update mode. Data representing the software update is transmitted via the update mode to apply the software update to the at least one peripheral device connected to the slave image processing device.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE INVENTION

Figure 1:
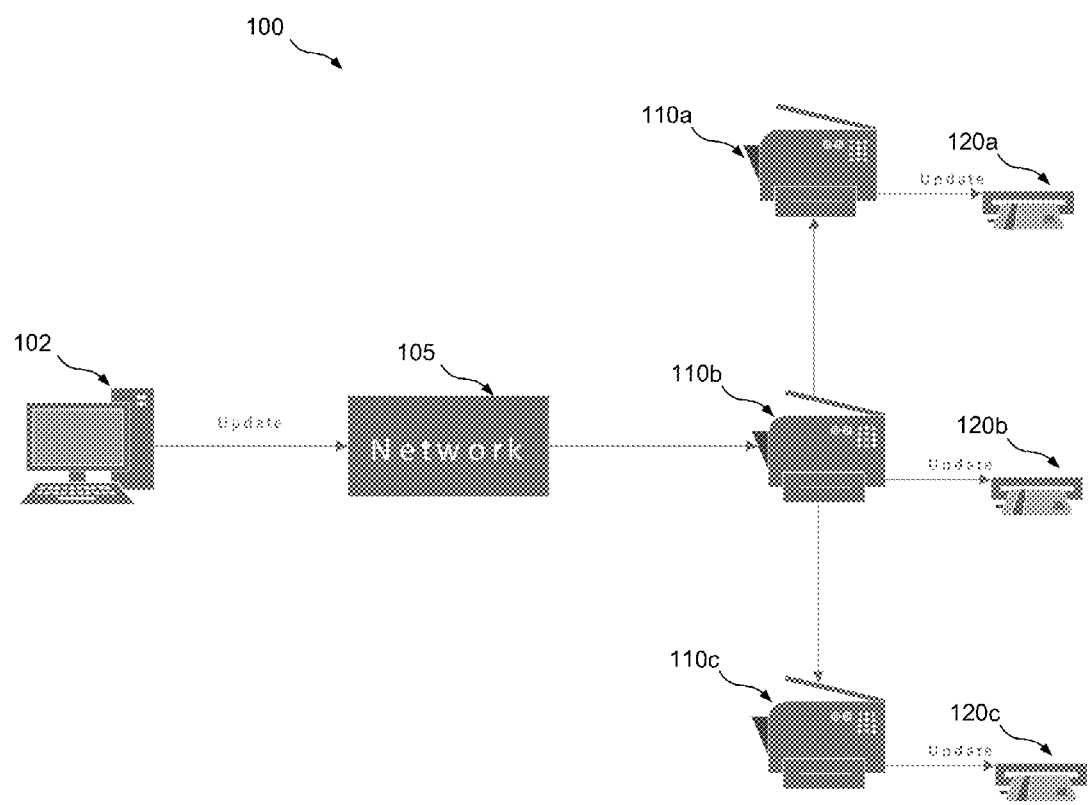
FIG. 1 illustrates an example network environment.

An image processing device according to invention principles advantageously enables updating of software stored in a memory of and executing on a peripheral device that is electrically coupled to the image processing device. The image processing device includes one or more sets of instructions representing an update application that can be executed by a processor or controller of the image processing device and which controls the image processing device to acquire one or more data objects representing a software update to be applied to a peripheral device. The update application transmits control signals to modify and/or change an operational state of the peripheral device and provides the software update data objects thereto and causes the peripheral device to be updated to reflect any configuration or operational changes that are defined in the software update data object all while the peripheral device remains electrically connected to the image processing device. In this manner, according to invention principles, the operation of the image processing device is improved because it remedies currently existing deficiencies associated with providing software updates such as physical disconnection of the peripheral device and reconnection to a dedicated update terminal tasked with updating the peripheral device.

The operational improvement provided herein can be understood using the following example. In an example where the image processing device is a multifunction peripheral (MFP) device that enables photocopying, scanning and printing functionality, it is common for the MFP to include a card reader peripheral that can selectively read identification cards using one or more card reading formats. The card reader peripheral may be electrically connected to and communicate with the MFP via a connection such as universal serial bus connection. When the card reader peripheral requires a software update (e.g. firmware update), because of the configuration of the MFP which is unable to directly access the update mechanism on the peripheral, a software update can only occur by physical disconnection of the card reader from the MFP and reconnect the card reader to another computing device. After the updates are completed, the card reader needs to be reconnected to the MFP. The drawbacks associated with prior update procedures include requiring a person to be physically present at each MFP and perform multiple steps using multiple different computing devices to update the firmware or configuration of a card reader peripheral which is attached to MFP. These drawbacks are only amplified when considering an environment where there are many MFPs deployed as part of a fleet. For example, if there are 1000 readers, the user needs to perform the disconnection, update, reconnection process 1000 different times in order to finish updating all the readers in his/her environment. The result of this is decreased security and reliability of the MFPs throughout a fleet because it is likely that certain machines will have the most recent firmware while others will be operating with out of date and potentially less secure firmware which may affect the ability to correctly authenticate user access to respective MFPs.

Embodiments of the present invention are described with reference to the following drawings. FIG. 1 illustrates an example network environment including 110 a first image processing device 110a having an associated peripheral device 120a electrically coupled thereto, a second image processing device 110b having an associated peripheral device 120b electrically coupled thereto and a third image processing device 110c having an associated peripheral device 120c electrically coupled thereto are each connected to one another by a network 105. While FIG. 1 depicts three image processing devices 110a-110c, it should be understood that this is merely exemplary to illustrate an environment where a plurality of image processing devices (hereinafter referred to using reference numeral 110) having respective peripheral devices (hereinafter referred to using reference numeral 120) are networked together via a communications network 105. Also shown for purpose of example is each image processing device 110 including only one peripheral device 120. It should be understood that any number of peripheral devices 120 may be coupled to each image processing device 110, the number of which is limited to the available connection ports and connections types of the respective image processing device 110. For example, an image processing device 110 may include a plurality of input/output ports (I/O) such as universal serial bus ports which enables connection of a number of devices equal to a number of ports or, a greater number of devices than a number of I/O ports by using intermediary connection hardware such as a hub device which expands the number of available ports on the image processing device 110. In another example, the peripheral devices may be coupled to the image processing device via wireless communication using a short-range wireless communication protocol such as BLUETOOTH® or a longer range wireless communication protocol such as WIFI®.

In one embodiment, the peripheral device 120 is a smart card reader that is able to selectively sense data from an smart card that is associated with a user. When an image processing device 110 authenticates the user by an authentication system (either locally or remotely), access to the image processing device 110 is granted to the user in possession of the smart card. In certain embodiments, the smart card reader and associated smart cards read by the reader may be one of a contact smart card or a contactless smart card. A contactless smart card reader senses radio frequency signals from an RF chip in an associated contactless smart card and senses data stored thereon. Alternatively, a contact smart card reader includes contact sensors which require a predetermined number of points of contact be made with a chip in a contact smart card to obtain the data in the chip. Data contained in the RF chip or the contact card chip may be used in similar manners such as authenticating a user to an image processing device. Contact and contactless smart cards are described for purposes of example only and the peripheral device 120 may be any type of smart card reader that is able to sense data from its associated type of smart card. In other embodiments, the peripheral may be another type of authentication peripheral such as a biometric data scanner which senses biometric data from a user and provides the sensed data to an authentication system for authentication thereof.

At least one computing device 102 may be connected to the image processing devices 110 via network 105. The computing device 102 may be include any one of a (a) personal computer; (b) a server; (c) a mobile computing device; (d) a tablet; and/or (e) a smartphone. In other embodiments, the computing device 102 may be directly connected to any of the image processing devices 110. The computing device 102 may include one or more processors, memory and one or more storage devices which may store one or more data objects representing software that may be used to update the at least one peripheral 120 connected to the image processing device 110. The computing device 102 may include at least an update application, which when executed by the one or more processors, loads the update application into memory and controls the computing device 102 to communicate with at least one image processing device 110 to which the computing device 102 is connected by network 105. The update application retrieves from the storage device of the computing device 102, data objects formatted in a manner suitable for network communication and transmits the data objects representing the software update to the one or more image processing devices 110 which then apply the software update as will be discussed below.

Each image processing device 110 includes hardware, software, or both for providing the functionality of the image processing device 110. In some embodiments, the image processing device 110 performs one or more steps of one or more methods described or illustrated herein. In some embodiments, the image processing device 110 provides functionality described or illustrated herein. In some embodiments, software stored in read only memory and/or on a storage device (e.g. hard disk drive, flash memory, etc.) and executed by a processor circuit of the image processing device 110 performs one or more steps of one or more methods described or illustrated herein or provides functionality described or illustrated herein.

Figure 2:
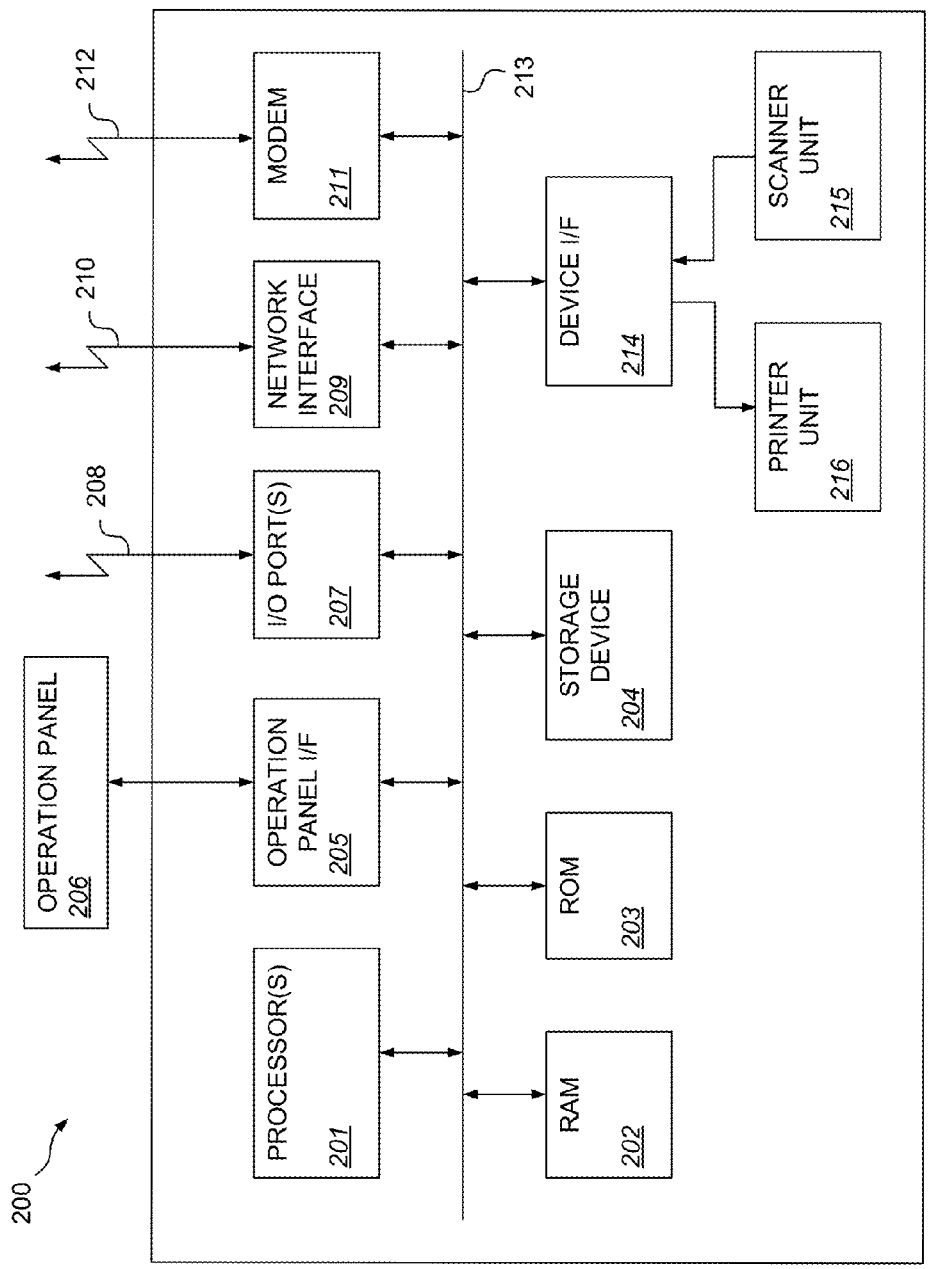
FIG. 2 illustrates an example image processing device.

The arrangement illustrated in FIG. 1 achieves the goal of reducing a number of steps and physical interactions with users that is required to updates a peripheral device 120 (e.g. card readers) attached to the image processing device 110. A further advantage provided by this arrangement is to enable a single user to manage and update peripheral devices 120 connected to a plurality of image processing devices 110 from a single computing device 102 without having to manually disconnect the peripheral device 120 from the image processing device 110 and connect the computing device 102 to each peripheral 120 in order to apply the update. For example, the user can remotely update the configuration or firmware that controls the operation of a peripheral device from a web browser or centralized application on a server without unplugging the reader from MFP via an application web page hosted by the image processing device. In one embodiment, an update application stored on and executed by the image processing device 110 provides a web page which is remotely accessible by the computing device 102 which enables a user to upload one or more data objects representing a firmware file or configuration setting file that is to be applied to the peripheral device 120 (e.g. card reader). In this manner, web page broadcasted by the update application enables the remote computing device to access the update application and interact therewith. The update application executing on the image processing device 110 acts as an agent that receives the request from the computing device, via network 105, receives the data objects and performs an update on the peripheral device card reader to install the software contained in the received data object. The request and application of data objects may contains new configuration settings or new firmware data for controlling or otherwise governing operation of the peripheral device 120. During the communication, the update application sends firmware update command or configuration update command to the peripheral device 120 along with the data contained in the received data object included in the request. When updating the peripheral device 120, the update application performs a communication mode check to identify a communication mode and pathway that is inactive and no used during a normal communication mode though which the peripheral device 110 and the image processing device 120 communicate. After all data is transmitted to card reader, the update application executing on the image processing device issues a "restart" command for restarting the peripheral device 120 (e.g. card reader) to complete the update process. When performing the update, the update application FIG. 2 illustrates an example image processing device 300. In some embodiments, the image processing device 110 of FIG. 1 comprises the image processing device 200. The image processing device 200 of FIG. 2 is a multifunction peripheral having a scanning function in addition to printing, copying and other functions. However, it will be understood that various other implementations of an image processing device are within the scope of the present invention. For example, various components, modules, functions, and/or configurations of the image processing device 200 of FIG. 2 could be combined, deleted, or modified to form further implementations. Further by way of example, in some embodiments, other devices (for example, a stand-alone scanner, fax machine, or other device with scanning capabilities) and/or computing systems (for example, a computer connected to a scanner) may be implemented as the image processing device 200.

In some embodiments, the image processing device 200 performs one or more operations described herein. In some embodiments, the image processing device 200 provides functionality described herein. In some embodiments, software running on the image processing device 200 performs one or more operations described herein.

The image processing device 200 includes one or more processor(s) 201. The processor(s) 201 include a central processing unit (CPU) that performs overall control functions for the image processing device 200. The processor(s) 201 are hardware and comprised of one or more integrated circuits. The CPU uses a random access memory (RAM) 202 as a work area while executing instructions. The CPU executes instructions of various programs stored in one or more memory devices. For example, the CPU executes programs stored in a read only memory (ROM) 203 and in a storage device 204. In certain embodiments, storage device 204 may include hard disk drives utilizing magnetic storage or a solid-state disk drive.

In some embodiments, the processor(s) 201 include one or more processors in addition to the CPU. By way of example, the processor(s) 201 may include one or more general-purpose microprocessor(s), application-specific microprocessor(s), and/or special purpose microprocessor(s). Additionally, in some embodiments the processor(s) 201 may include one or more internal caches for data or instructions.

The processor(s) 201 provide the processing capability required to execute an operating system, application programs, and various other functions provided on the image processing device 200. The processor(s) 201 perform or cause components of the image processing device 200 to perform various operations and processes described herein, in accordance with instructions stored in one or more memory/storage devices.

The RAM 202 is used as a work area when the processor(s) 201 execute various instructions, such as those making up computer programs stored in the ROM 203 and/or the storage device 204. The RAM 202 may be used as a temporary storage area for various data, including input image data. The RAM 202 may be used as a cache memory. In some embodiments, the RAM may be dynamic RAM (DRAM) or static RAM (SRAM).

The ROM 203 stores data and programs having computer-executable instructions for execution by the processor(s) 201. In some embodiments, the ROM 203 is a boot ROM, storing instructions for the booting process. In some embodiments, the ROM 203 may be flash memory.

The storage device 204 stores application data, program modules and other information. One or more program modules or applications stored in the storage device 204 are configured to cause various operations and processes described herein to be executed. For example, in some embodiments, the storage device 304 stores instructions embodied as an update application, which when loaded into RAM 202 by CPU 201, generates and provides to a computing system via network connection, a web page enabling a computing system to access the image processing device 200 and receive a request to update one or more peripheral devices coupled to the image processing device 200. The update application may also receive data representing a software update to be applied to one or more peripheral coupled to the image processing device and interface with the peripheral which remains directly connected to the image processing device 200 to apply the received software update in accordance with embodiments described herein. In some embodiments, the update application resides on the storage device 204 and executes on the image processing device 200.

In other embodiments, the update application, when executed by the image processing device 200, can selectively (or periodically) communicate with an external computing device to receive data objects representing additional information to be used in a peripheral update process. The data objects may include successive versions of software to be installed on the peripheral device. Additionally, the data objects may include configuration information used in performing a configuration operation on the peripheral device. In this instance, the configuration information may be in a predetermined configuration format and includes one or more data values that can be set on the peripheral device 120. The configuration data may configure one or more software applications executing on the peripheral device as well as hardware settings governing peripheral operation.

In yet another embodiment, the update application stored in storage device 204 may include a fleet update operation for updating a plurality of peripheral devices each connected to respective image processing devices 200. In exemplary operation, the fleet update operation, when engaged, controls the image processing device 200 to set itself as a "master" device which can selectively distribute data objects representing software update (or configuration updates) to other image processing devices on the network. The update application performs a device query which is communicated across the network to identify other image processing devices 200 that are present each of which will return device identification information and information identifying any peripheral devices connected thereto. The peripheral information may include, for example, information identifying a type and version of software executing thereon as well as configuration values currently set for one or more settings. The update application may compare the received peripheral information associated with each image processing device to determine a similarity of the peripheral device connected to an other image processing device on the network is the same as the peripheral device coupled to the image processing device 200 which is executing the fleet update operation of the update application. In one embodiment, the similarity determination is made by comparing information representing at least one of (a) peripheral device identification information and (b) software executing on the peripheral device (e.g. firmware including version data). In response to determining that the peripherals are the same type and that a software version on a peripheral device connected to an other image processing device needs updating, either because that version is earlier than a version currently installed on the peripheral connected to the master device or the version is earlier than a version included in a software update data object, the fleet update operation sends a control signal to the other image processing device causing the other image processing device to operate as a slave device. The control signal is received by the update application executing on the other image processing device which switches the device into slave mode and confirms the operational switch to the master and includes address information which enables the update application executing on the master image processing device to transmit data objects representing the software update (and/or configuration data) to the slave device which then automatically installs the software update (and/or configuration data) on the peripheral device connected thereto. This process occurs for each image processing device that is discoverable on the network and that includes a peripheral device connected thereto. Once the update has been applied to the peripheral, the update application executing on the slave image processing device modifies its operational status into a normal operation mode and is now able to use the peripheral device with update software and/or configuration.

The storage device 204 also stores other programs and data to be processed. For example, the storage device 204 stores an operating system including programs and data for managing hardware and software components of the image processing device 200. Applications on the image processing device 200 may utilize the operating system to perform various operations. The storage device 204 may further store other programs and/or drivers that enable various functions of the image processing device 200, graphical user interface (GUI) functions, and/or processor functions. The storage device 204 may also store data files including, for example, image data, user data, configuration information, GUI components, such as graphical elements or templates, or other data required by the image processing device 200. In certain embodiments, the storage device 204 may also store data objects representing a software update package received from an external computing device (e.g. 102 in FIG. 1) or another image processing device. In another embodiment, the data object may represent configuration information for configuring one or more setting of a peripheral device coupled to the image processing device 200. The data object may then be accessed by one or more applications executing on the image processing device 200 (e.g. the update application) and communicated/transmitted to at least one (a) a peripheral device for applying an update to the control software of the peripheral device and (b) a further image processing device such that the further image processing device may be able to apply the software update to a peripheral device connected thereto (e.g. the fleet update operation discussed above).

In some embodiments, the image processing device 200 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the image processing device 300. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

An operation panel interface 205 provides output signals to and receives input signals from an operation panel 206. Regarding the output signals, the operation panel interface 205 provides GUI data to the operation panel 206 for display device such as a liquid crystal display (LCD) and/or a light emitting diode (LED) display. Regarding the input signals, the operation panel interface 205 receives input signals based on user input operations at the operation panel 206 and relays the input signals to the processor(s) 201. In some embodiments, the operation panel 206 includes a touch sensitive element operable to receive user input operations or commands based on the touching of graphical objects displayed on the LCD. In some embodiments, the operation panel 206 includes a hard key panel.

The image processing device 200 includes one or more input/output (I/O) port(s) 207. The I/O port(s) 207 may include any suitable interface type such as a universal serial bus (USB) port, FireWire port (IEEE-1394), serial port, parallel port, or AC/DC power connection port. The I/O port(s) 207 enable one or more external device(s) 208 to communicate with the image processing device 200 when the external device(s) 208 is/are connected to the I/O port(s) 207. Examples of external devices 208 include a near field communication (NFC) interface (for example, an NFC reader), a smart card reader, radio-frequency identification (RFID) reader, device for detecting biometric information, a keyboard, keypad, sensor(s), a combination of two or more of these, or other suitable device.

A network interface 209 includes hardware, software, or both providing one or more interfaces for communication (such as, for example, packet-based communication) between the image processing device 200 and one or more other computing systems or one or more networks 210. As an example and not by way of limitation, the network interface 209 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 210 and any suitable network interface 209 for it. As an example and not by way of limitation, the image processing device 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 210 may be wired or wireless. As an example, the image processing device 200 may communicate with a wireless PAN (WPAN) (such as, for example, a BLUETOOTH WPAN), a WI-FI network, a WI-MAX network, or other suitable wireless network or a combination of two or more of these. The image processing device 200 may include any suitable network interface 209 for any of these networks 210, where appropriate.

A modem 211 modulates/demodulates image data and control signals. The modem 211 is connected to the Public Switched Telephone Network (PSTN) and performs input/output of information between the image processing device 200 and the PSTN. By way of example, the modem 211 may send/receive facsimile communications.

A system bus 213 interconnects various components of the image processing device 200 thereby enabling the transmission of data and execution of various processes. The system bus 313 may include one or more types of bus structures including a memory bus or memory controller, a peripheral bus, and a local bus using any of a variety of bus architectures.

The device interface 214 is connected to the scanner unit 215 and to the printer unit 216. The device interface 214 performs synchronous/asynchronous conversion of image data.

The scanner unit 215 includes a light source and an image sensor. The scanner unit 215 may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 215 includes an optical system (for example, mirrors, lens) that directs the light to the image sensor. After the image sensor generates the electrical signals, an analog-to-digital converter converts the electrical signals to digital image data representing the scanned physical document. The scanner unit 215 then outputs the digital image data to one or more other components of the image processing device 200 via the device interface 214.

The printer unit 216 is an image output device for printing on a sheet an image corresponding to image data. In response to a print command received at the image processing device 200, the printer unit 216 receives image data via the device interface 214 and outputs to a sheet an image corresponding to the image data.

Figure 3:
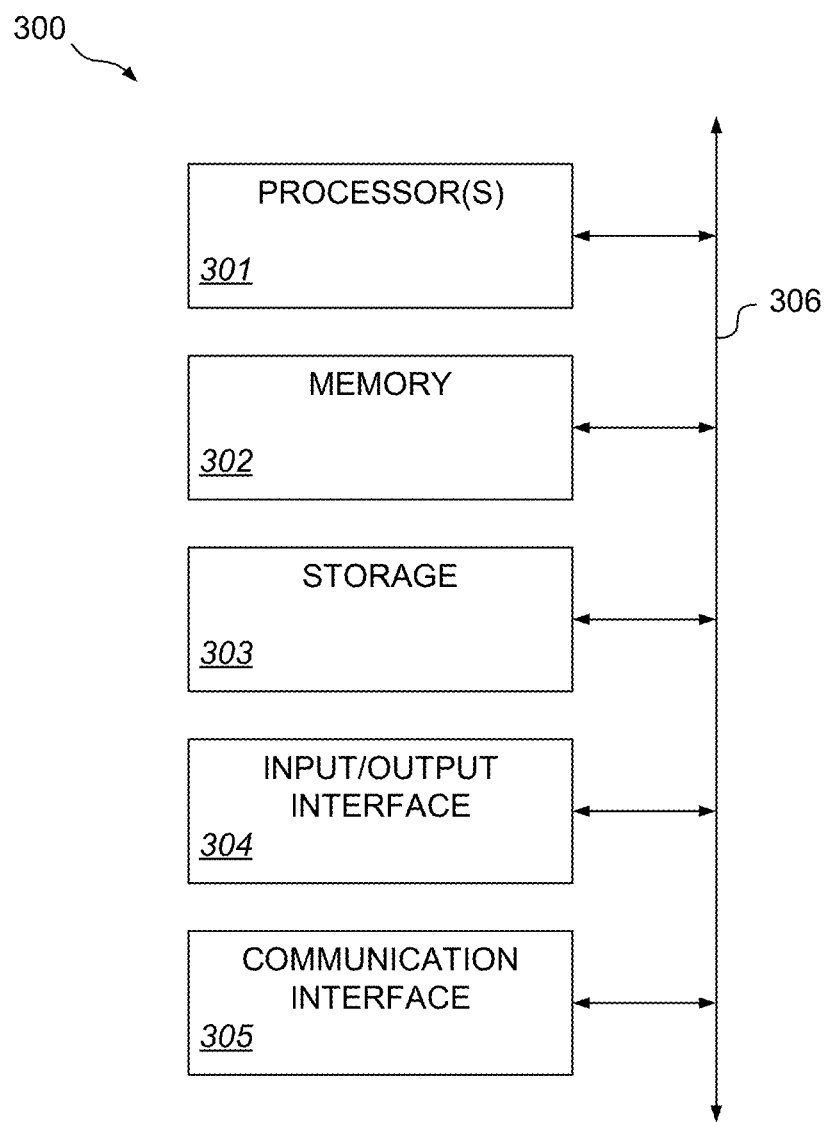
FIG. 3 illustrates an example computing system.

FIG. 3 illustrates an example computing system 300. According to various embodiments, all or a portion of the description of the computing system 300 is applicable to all or a portion of one or more of the image processing device 110 and the computing system 102 of FIG. 1.

The term computing system as used herein includes but is not limited to one or more software modules, one or more hardware modules, one or more firmware modules, or combinations thereof, that work together to perform operations on electronic data. The physical layout of the modules may vary. A computing system may include multiple computing devices coupled via a network. A computing system may include a single computing device where internal hardware modules (such as a memory and processor) work together to perform operations on electronic data. Also, the term resource as used herein includes but is not limited to an object that can be processed at a computing system. A resource can be a portion of executable instructions or data.

In some embodiments, the computing system 300 performs one or more steps of one or more methods described or illustrated herein. In some embodiments, the computing system 300 provides functionality described or illustrated herein. In some embodiments, software running on the computing system 300 performs one or more steps of one or more methods described or illustrated herein or provides functionality described or illustrated herein. Some embodiments include one or more portions of the computing system 300.

The computing system 300 includes one or more processor(s) 301, memory 302, storage 303, an input/output (I/O) interface 304, a communication interface 305, and a bus 306. The computing system 300 may take any suitable physical form. For example, and not by way of limitation, the computing system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, PDA, a server, a tablet computer system, or a combination of two or more of these.

The processor(s) 301 include hardware for executing instructions, such as those making up a computer program. The processor(s) 301 may retrieve the instructions from the memory 302, the storage 303, an internal register, or an internal cache. The processor(s) 301 then decode and execute the instructions. Then, the processor(s) 301 write one or more results to the memory 302, the storage 303, the internal register, or the internal cache. The processor(s) 301 may provide the processing capability to execute the operating system, programs, user and application interfaces, and any other functions of the computing system 300.

The processor(s) 301 may include a central processing unit (CPU), one or more general-purpose microprocessor(s), application-specific microprocessor(s), and/or special purpose microprocessor(s), or some combination of such processing components. The processor(s) 301 may include one or more graphics processors, video processors, audio processors and/or related chip sets.

In some embodiments, the memory 302 includes main memory for storing instructions for the processor(s) 301 to execute or data for the processor(s) 301 to operate on. By way of example, the computing system 300 may load instructions from the storage 303 or another source to the memory 302. During or after execution of the instructions, the processor(s) 301 may write one or more results (which may be intermediate or final results) to the memory 302. One or more memory buses (which may each include an address bus and a data bus) may couple the processor(s) 301 to the memory 302. One or more memory management units (MMUs) may reside between the processor(s) 301 and the memory 302 and facilitate accesses to the memory 302 requested by the processor(s) 301. The memory 302 may include one or more memories. The memory 302 may be random access memory (RAM).

The storage 303 stores data and/or instructions. As an example and not by way of limitation, the storage 403 may include a hard disk drive, a floppy disk drive, flash memory, an optical disc, a magneto-optical disc, magnetic tape, or a Universal Serial Bus (USB) drive or a combination of two or more of these. In some embodiments, the storage 303 is a removable medium. In some embodiments, the storage 303 is a fixed medium. In some embodiments, the storage 303 is internal to the computing system 300. In some embodiments, the storage 303 is external to the computing system 300. In some embodiments, the storage 303 is non-volatile, solid-state memory. In some embodiments, the storage 303 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 303 may include one or more memory devices. One or more program modules stored in the storage 303 may be configured to cause various operations and processes described herein to be executed.

The I/O interface 304 includes hardware, software, or both providing one or more interfaces for communication between the computing system 300 and one or more I/O devices. The computing system 300 may include one or more of these I/O devices, where appropriate. One or more of these I/O devices may enable communication between a person and the computing system 300. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 304 includes one or more device or software drivers enabling the processor(s) 301 to drive one or more of these I/O devices. The I/O interface 304 may include one or more I/O interfaces.

The communication interface 305 includes hardware, software, or both providing one or more interfaces for communication (such as, for example, packet-based communication) between the computing system 300 and one or more other computing systems or one or more networks. As an example and not by way of limitation, the communication interface 305 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 305 for it. As an example and not by way of limitation, the computing system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computing system 400 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. The computing system 300 may include any suitable communication interface 305 for any of these networks, where appropriate. The communication interface 305 may include one or more communication interfaces 305.

The bus 306 interconnects various components of the computing system 300 thereby enabling the transmission of data and execution of various processes. The bus 406 may include one or more types of bus structures including a memory bus or memory controller, a peripheral bus, and a local bus using any of a variety of bus architectures.

Figure 4:
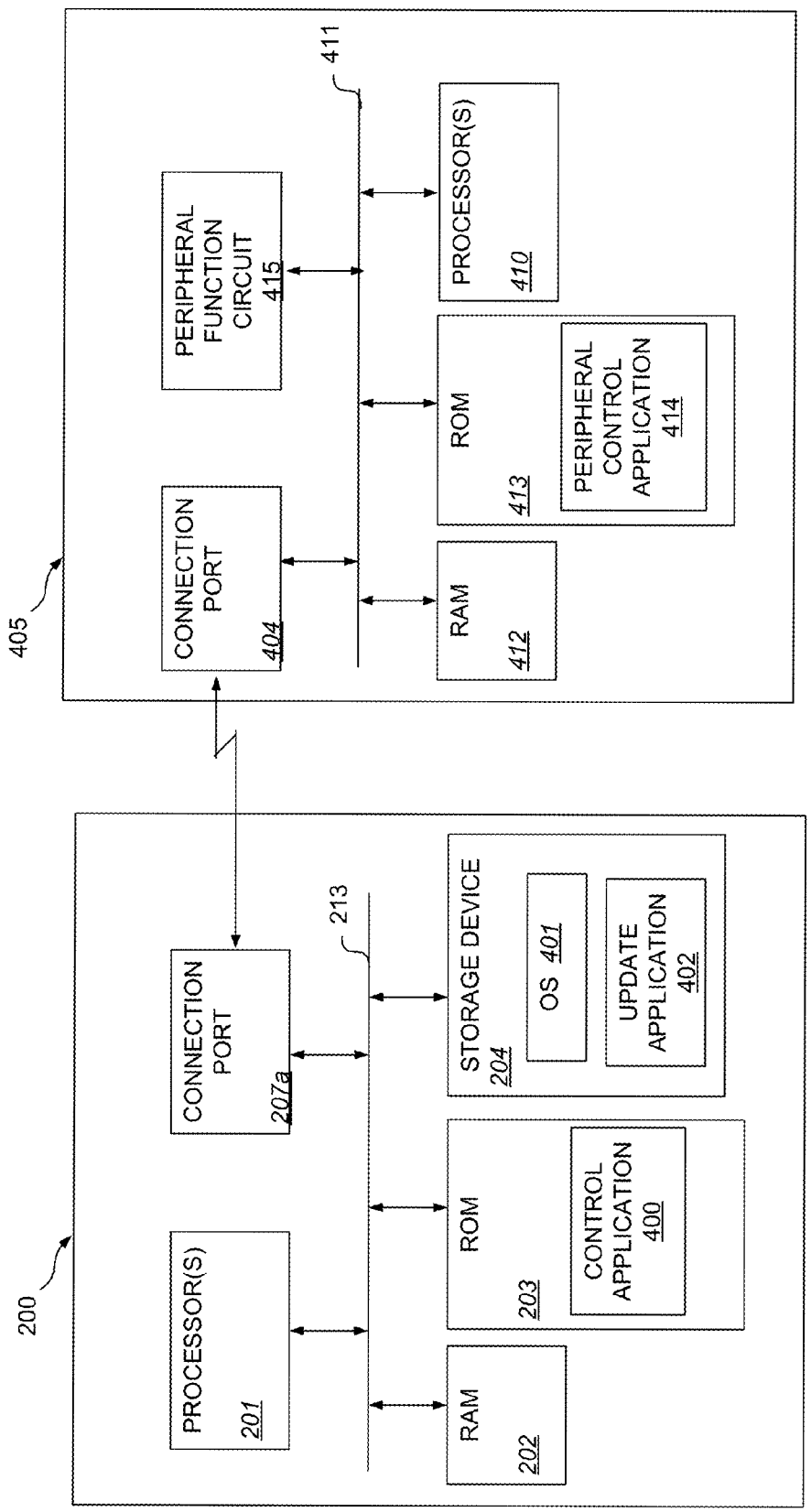
FIG. 4 illustrates an exemplary image processing device and attached peripheral device.

FIG. 4 is a block diagram illustrating the interconnection between an image processing device 200 (also shown as 110 in FIG. 1) and a peripheral device 405 (also shown as 120 in FIG. 1) such as discussed above in FIG. 2. This illustration provides only select components of the image processing device 200 that are used in accordance with the principles of the invention. However, despite certain components being omitted for brevity purposes, persons skilled in the art will understand that the image processing device 200 shown in FIG. 4 includes at least the same components having the same functionality as the image processing device 200 described in FIG. 2. Also shown herein is the exemplary hardware components of at least one type of peripheral device 405 that is coupled to the image processing device 200.

Turning first to the image processing device 200 which includes the processor(s) 201, RAM 202, ROM 203, storage device 204 and connection port 207a as discussed above in FIG. 2, the description of which is incorporated herein by reference. The storage device 204 includes one or more applications that are executable by the processor(s) 201. A first application is an operating system (OS) application which is loaded into specifically address sectors of RAM 203 and which controls the overall functionality of the image processing device 200. This may include, for example, printing and scanning functionality as well and image processing techniques and communication of data between the image processing device 200. The OS application 401 may also interface with other applications or applets stored on the storage device 204 to execute those other applications by loading data into specific sectors of the RAM 203 which will allow for control of one or more functions of the image processing device 401. In one example, either OS application 401 or a companion application (not shown) may enable the image processing device 200 to perform an authentication function for authenticating a user to determine whether or not the user is able to access or utilize one or more resource of the image processing device 200 to complete a particular task. For example, the one or more resource may include printing functionality, scanning functionality and/or data communication functionality to access and direct data that is created by and/or stored on the image processing device 200 to be communicated to an external computing system such as a server, computer, mobile device or the like.

In another embodiment, the OS application 401 alone or in combination with a further application may control access to and allow interfacing with the peripheral device 405. For example, these application enable the image processing device to open a communication channel via the connection port 207 to send and receive data in a predetermined format to the peripheral device 405 and make use of the data received from the peripheral device 405 to control one or more operations of the image processing device 200. For example, in an embodiment where the peripheral device is a card reader that can selectively sense data associated with an access card, as will be discussed in greater detail below, the OS application 401 (with any companion application) can selectively open the communication channel between the image processing device 200 and the peripheral device 405 to receive data objects representing an identifier associated with an access card read by the card reader. Thereafter, the OS application 401 (with any companion application) may parse the received data and provide it to an authorization application (not shown) that may be part of the OS application 401 or separately executable application, to challenge and determine if the user of the card presented at the card reader is able to access one or more resources of the image processing device 200.

Figure 5:
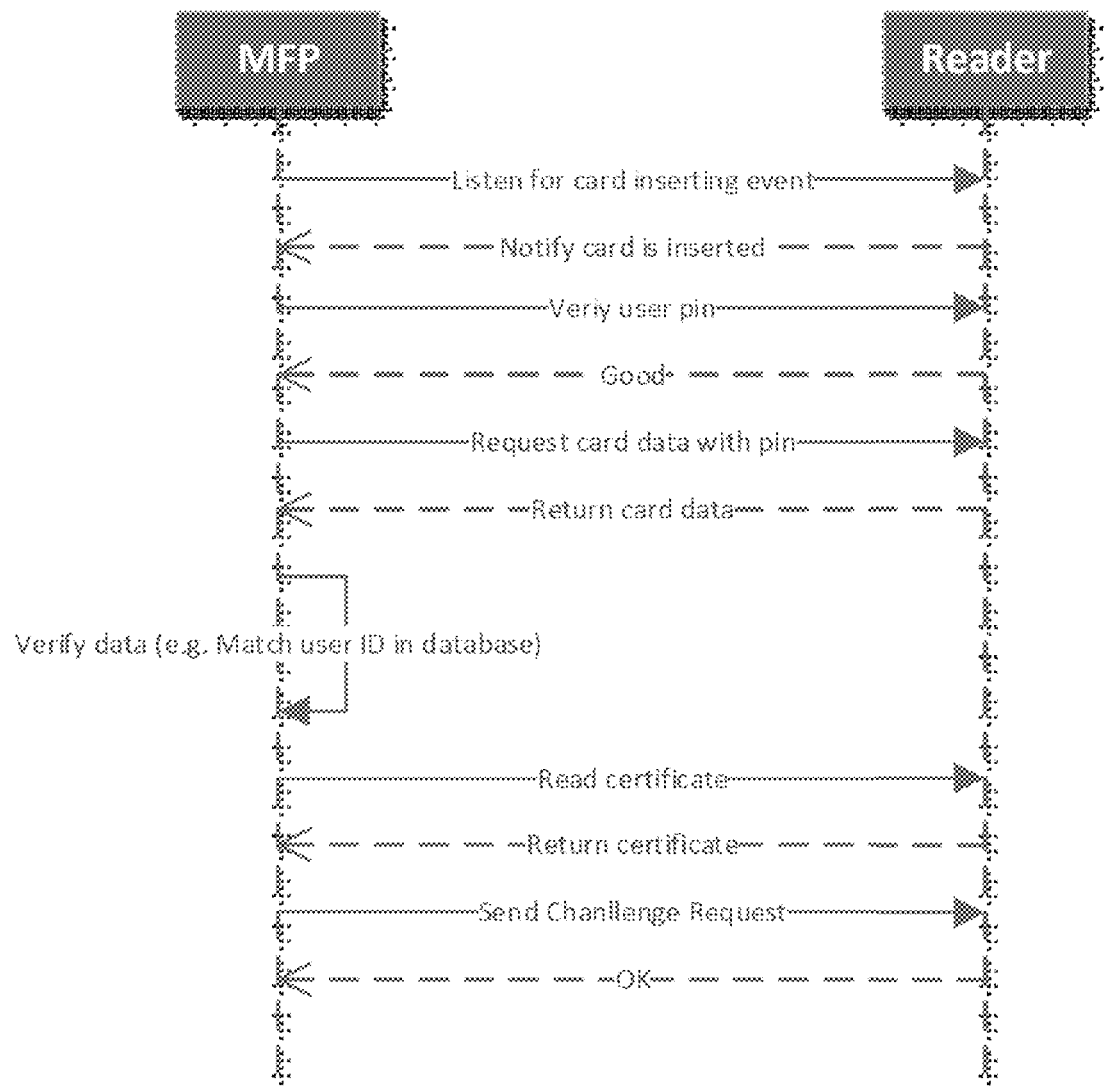
FIG. 5 is a sequence diagram detailing the operation of the peripheral device and image processing device.

An exemplary operation of a card reader device being the peripheral device 405 in FIG. 4 is shown in the sequence diagram of FIG. 5. As shown in FIG. 5, the OS application 401 periodically listens for a signal from the card reader 405 indicating that an access card (e.g. smart card) has been read. The card reader communicates a message indicative that a smart card has been read. This may include, for example, a smart card being inserted into a reader whereby physical contacts or other physical element (e.g. magnetic strip) on the smart card have been coupled to a reader mechanism. Alternatively, this may include the card reader including a radio (or other receiver circuitry) that senses data transmitted by short-range wireless communication protocols such as NFC or BLUETOOTH. The OS application 401 may request that a user enter a PIN or other personal identifier and data representative of the personal identifier is communicated via an open communication channel from the card reader to the image processing device. Upon a first validation of the personal identifier, the OS application 401 requests card identifier data derived from the card either inserted into or read by the card reader which is returned to the OS application 401 which then performs a secondary validation of the card identifier data which may, for example, query a database to compare the card identifier with known card identifiers and obtain permission data defining the permissions that a user having the checked card identifier data has with respect to operating and/or accessing one or more resources on the image processing device. At that point a series of certificate reads, returns and challenges are performed as is standard. Once completed, the OS application 401 has determined that the user associated with the access card presented at the reader device 405 may access one or more resources of the image processing device 200. This is merely one example of how an user may be authenticated to use one or more resources of an image processing device via the peripheral device 405 and it may or may not include all of the steps described herein above.

Turning back to FIG. 4, certain hardware components of the peripheral device 405 will now be described. The peripheral device 405 includes one or more processor(s) 410 at least one of which comprises a central processing unit that executes instructions which control all aspects of peripheral operation. The processor(s) 410 may provide the processing capability to execute a control program, user and application interfaces, and any other functions of the peripheral device 405 alone or in combination with software executing on the image processing device 200. The processor(s) 410 may include a central processing unit (CPU), one or more general-purpose microprocessor(s), application-specific microprocessor(s), and/or special purpose microprocessor(s), or some combination of such processing components. The processor(s) 410 may include one or more graphics processors, video processors, audio processors and/or related chip sets.

The peripheral device 405 further includes a ROM 413 storing dedicated instructions for controlling the operation of the peripheral device. In one embodiment, the instructions stored in ROM 413 may include a peripheral control application 414 including one or more executable routines that control various operations of the peripheral device 405. The peripheral control application 414 may also include configuration data including values representing one or more settings associated with one or more elements of the peripheral device 405. In certain embodiments, the peripheral control application 414 may be firmware which may be selectively updateable to at least one of add additional operation features and/or configuration data. RAM 412 is further included in the peripheral device 412 and serves as a work area for instructions being executed by the one or more processor(s) 410.

A peripheral function circuit 415 is configured to perform one or more functional actions of the peripheral device. The peripheral function circuit 415 may include hardware and/or software instructions for controlling the hardware which allows the peripheral device to perform a particular function.

A connection port 404 is further provided an enables connection of the peripheral device to the connection port 207a of the image processing device. In certain embodiments, the connection ports 207a and 404 are universal serial bus ports that are connected to one another by a universal serial bus cable. This type of connection is described for purposes of example only and any type of wired connection such as serial, lightning, parallel, Ethernet or the like may be used as per their native specifications. In other embodiments, the connection ports 207a and 404 may be wireless connection ports and communicate via short range wireless communication protocols such as BLUETOOTH or longer range communication protocols such as WIFI. In certain embodiments, power may be provided from the image processing device 200 via the connection between connection ports 207a and 404.

A bus 411 interconnects various components of the peripheral device 405 thereby enabling the transmission of data and execution of various processes. The bus 411 may include one or more types of bus structures including a memory bus or memory controller, a peripheral bus, and a local bus using any of a variety of bus architectures.

One exemplary embodiment of a peripheral device 405 will now be described. In one embodiment, the peripheral device 405 is a card reader device and the peripheral function circuit 415 is a card reader circuit that is able to read data associated with an access card. The card reader 415 may be a contact-based card reader such that it includes a housing that receives therein an access card having a source of data stored data thereon (e.g. a chip, one or more electrical contacts, a magnetic strip, etc.). Alternatively, the card reader 415 may be a radio frequency card reader able to sense data stored on the source of the access card via one of NFC or BLUETOOTH communication protocols.

The card reader circuit 415 is selectively controlled according to the various instructions included in the peripheral control application 414, which in this embodiment, is a card reader control application 414.

Execution of the card reader control application 414 by the one or more processor(s) 410 control a reading function whereby the card reader circuit 415 is selectively controlled to read data from a data source on an access card. The manner in which data is read from a source on an access card is known in the art and is not the subject of the present invention and need not further be described. The card reader control application 414 also includes instructions that when executed perform a communication function that utilizes the data read by the card reader circuit 415 and communicates it to the image processing device 200 via the cable coupling the respective connection ports 207a and 404 to one another. The communication function enabled by the card reader control application will now be further described.

The communication function of card reader control application 414 includes at least two communication modes for communicating data between the card reader 405 and the image processing device. A first communication mode is an operational communication mode that enables communication between the peripheral device 405 and the image processing device 200. In one embodiment, the first communication mode uses a particular protocol specific to the type of connection that connects the card reader device 405 to the image processing device and uses protocols to enable data to be bidirectional communicated between the card reader device 405 and the image processing device 200. For example, if the connection type is a USB connection the first communication mode may use USB communication protocols.

In the first communication mode, the peripheral control application 414 may translate data objects read by the card reader circuit 415 from a first format into a second different format that is usable by the image processing device for a specific purpose such as authentication. In one example, the peripheral control application 414 controls the peripheral function circuit to read digital signals read from a source such as a chip or magnetic strip, parse the data, and repackage and transmit the data read from the source to the image processing device 200 using the first communication mode. In certain embodiments, the first communication mode represents an active communication pathway that enables bidirectional communication of data between the peripheral device 405 and the image processing device 200 for a particular purpose in a normal operation mode. Thus, in a normal operation mode, the peripheral device may operate for its intended purposes. For example, in the instance where the peripheral device 405 is a card reader, the normal operation mode is to read data from a source associated with a user (e.g. an identification card) and transmit the read data to be authenticated by the image processing device 200 to determine if the user associated with the source should be able to access one or more resources on the image processing device.

A second communication mode is a communication mode that makes use of a communication pathway that is one of unavailable or unused during the first communication mode. This second communication mode may also be a communication pathway that could be usable for communication with the image processing device 200 but is configured as not used or inactive. The second communication mode may be an update mode. In certain embodiments, the second communication mode may be common to any card reader device and may utilize a device type communication protocol to allow for a device of a specific type to communicate with the image processing device to which the device 405 is connected. In one embodiment, the second communication or update mode uses a protocol having a distinct message format including a header having a predetermined byte size and a message payload. One example of a protocol used by the second communication mode is communication mode may be a chip card interface device (CCID) mode.

The problem resolved according to invention principles relates to the update process that is needed when the card reader control application (e.g. firmware) needs to be updated. Conventionally, the card reader device 405 needs to be disconnected from the image processing device 200 and a computing device (e.g. 102 in FIG. 1) needs to be directly coupled to the connection port 404 and the card reader application 414 emulates a webpage that allows a user of the computing device (102 in FIG. 1) to access an interface whereby the user can manually select an update function and transmit updated software from the computing device to the card reader device. However, as discussed above, this is cumbersome and difficult when a fleet of image processing devices each having a card reader attached thereto need to be updated.

To remedy this deficiency, the update application 402 executing on the image processing device 200 is able to improve the operation of the device and card reader by preventing the need to disconnect the card reader device 405 to perform an update.

Figure 6:
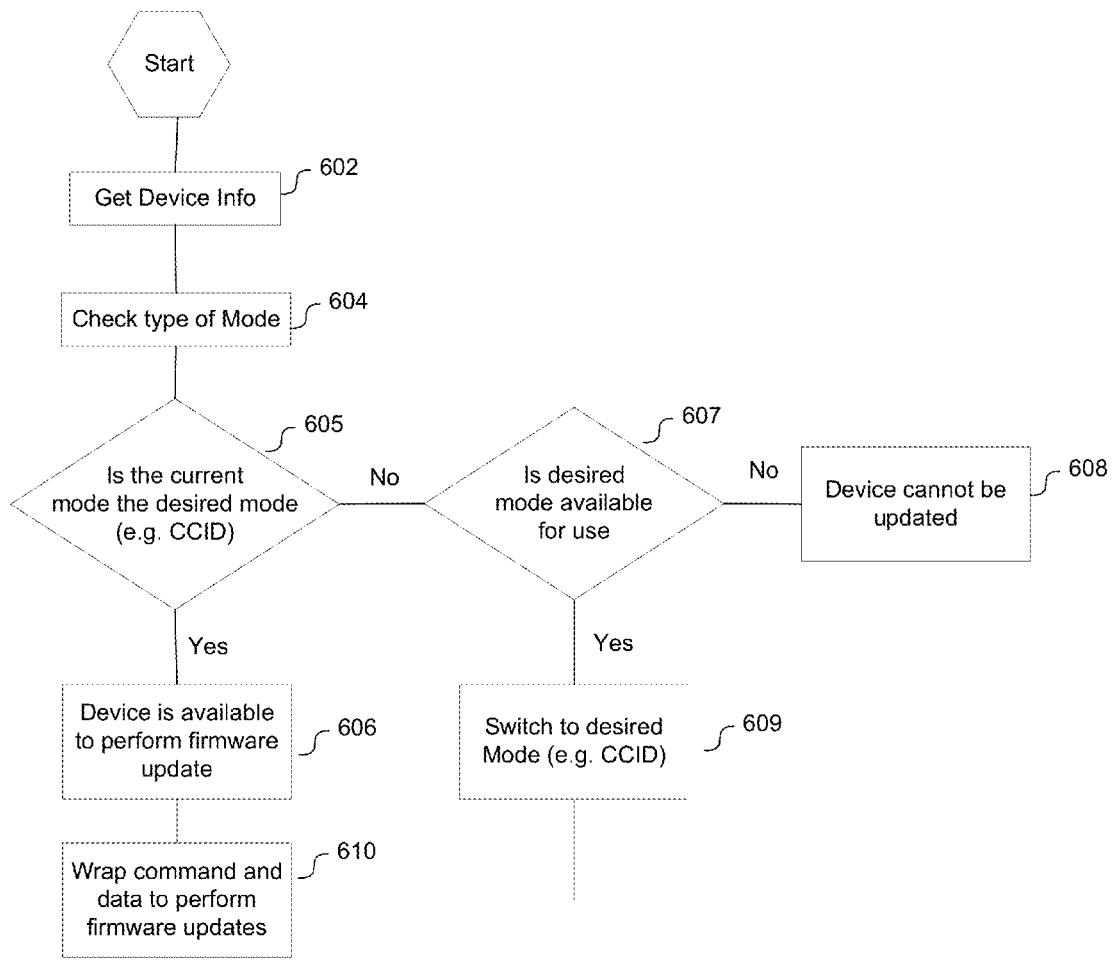
FIG. 6 illustrates is a flow diagram detailing further operation of the system according to invention principles.

An example of the update workflow is illustrated in FIG. 6 and will be described herein. Upon receiving data object representative of a firmware (or other software) update, the update application 402 polls the peripheral device 405 to get device information in step 602. In step 604, the update application 402 identifies types of communication modes that may be available in the peripheral device 405 but which are not being used in the first communication mode that governs normal communication operation between the peripheral device 405 and the image processing device 200. Upon successful receipt of information identifying at least a second communication mode, the update application 402 determines, in step 605, if a current operational mode is a desired update mode and whether that desired update mode is available. If the current mode is determined to be the desired update mode, then the update application 402 identifies the device as being available for update in step 606 and performs the update in step 610. If the determination in step 605 indicates that the current mode is not the desired update mode in step 605, update application 402 determines if the desired mode is available for use in step 607. If the determination is negative, a message is communicated back to the update application in step 608 indicating that update cannot be performed. If the determination in step 607 is positive, the update application 402 generates a mode switch message which is communicated instep 609 to the peripheral control application to switch the current mode to be the desired update mode and an update may be performed in step 610.

An exemplary operation set forth in step 610 will now be described. The update application 402 generates a first message using a protocol associated with the second inactive communication mode. In one embodiment, the first message may be a protocol format having a header with a predefined format and a payload. In one embodiment, the messages may be formatted as application protocol data unit messages which is the command languages associated with CCID communication modes.

In the first message the payload may include a switch command which controls the card reader control application 414 to switch the communication modes that are currently enabled from the first normal operation communication mode to the second inactive update communication mode. The update application 402 access the stored data object that contains the software update and converts the data into a format that is compatible with a communication protocol associated with the update mode so it can be transmitted to the peripheral device 405. Thereafter, a second message is generated and includes the updated software as part of the payload which is communicated over a specific USB channel opened by the update application 402. It should be noted that, depending on the size of the software update being applied and the constraints of the payload in each message, more than one second message may be needed to communicate the updated software to the card reader device. Upon receipt of the second message, the card reader control application 414 initiates a native update process to incorporate the updated software into the card reader control application 414 (or firmware). This, for example, may include updating and/or modifying configuration information used during card reader operation. Thereafter, the card reader device 405 is restarted and the updated software is enabled. The restart may be controlled locally on the card reader device 405 or may be initiated by a command issued from the update application 402 executing on the image processing device 200.

In one embodiment, the update application 402 may include a web servlet, a command manager, a CCID wrapper and a card reader handler. The web servlet allow the update application to receive the updated software from a user or other computing device. A command manager controls what commands are needed for the connected reader for updating the firmware. The CCID wrapper constructs all the commands into APDU format. The card reader handler communicates to the reader via APDU such that when user uploads the firmware or configuration file, the application delivers the firmware or configuration file to card reader via CCID using APDU commands. It may require one or more APDU commands to complete the process depend on the card reader specification.

Figure 7:
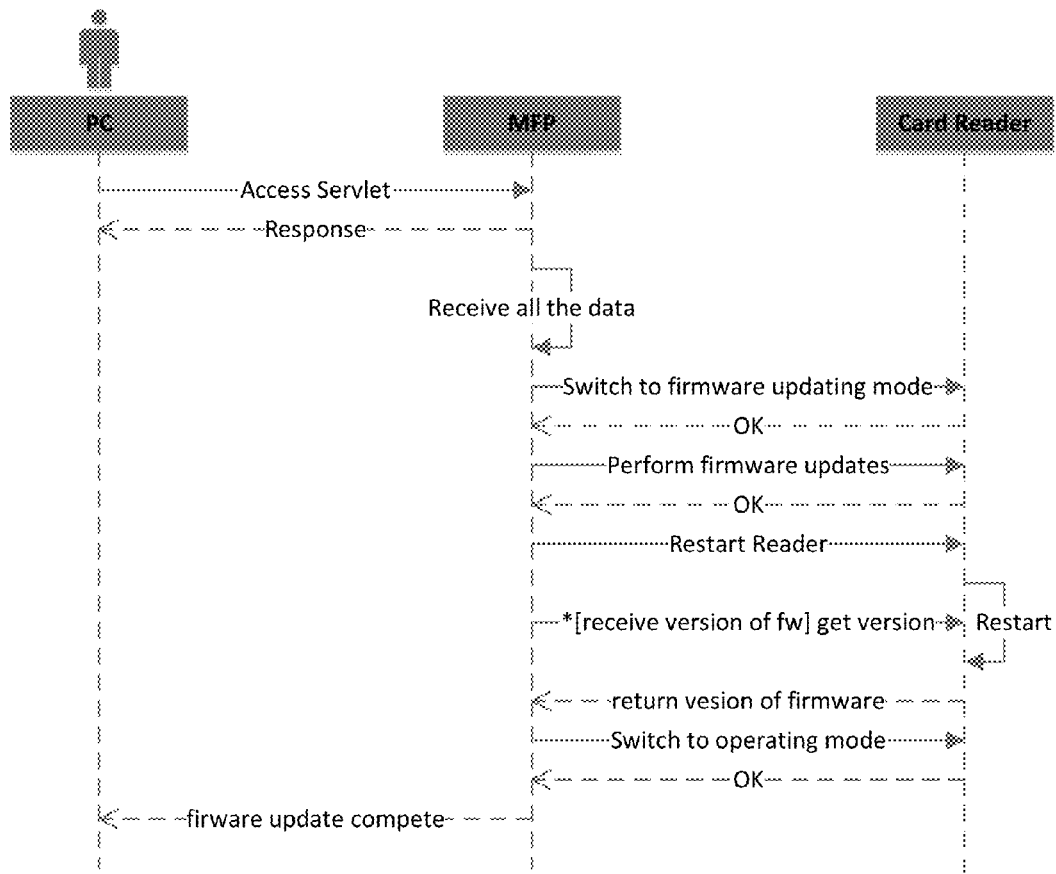
FIG. 7 is a sequence diagram detailing the operational flow of the system according to invention principles.

FIG. 7 is a sequence flow diagram detailing an exemplary algorithm executed by the update application 402. In operation the update application 402 generates a webpage and uses the web servlet to enable a user to access a webpage for the update application which is being hosted by the MFP. A user uploads data representing the software update (e.g. firmware file) from the web page and the update application of MFP receives the data file. This manner of acquiring the data file representing the software update is described for purposes of example only. In other embodiments, the update application may periodically poll a server or other data store to identify whether a data file representing a software update is present. In another embodiment, the update application may include a messaging client and receive a message in a predetermined message format including an data object representative of the software update. In further embodiments, data objects representing the software update may be pushed to the image processing device. Additionally, the software update may be delivered by direct connection of a mobile computing device or removable storage device to the image processing device 200.

The update application generates a message to switch the card reader from a normal operation mode to a desired update mode The update application communicates with card reader to perform firmware update using update mode commands (e.g. CCID commands) which have delivered the payload comprising the software update to the card reader application. The update application restarts the card reader and keep polling to get version of firmware which is returned to the update application by the reader after restart of the card reader device. The update application 402 generates a subsequent switch message to switch the active communication modes of the card reader device from the update mode back to the operational mode which completes the update process.

In one embodiment, the update application 402 may generate a user interface that is selectively displayed on a display screen of an operation panel (206 in FIG. 2) of the image processing device 200 which enables user interaction with the update application 402. The user interface may include one or more user selectable image elements that provide information specifying a source from which data representing the software update may be acquired. The user interface may also include image elements that enable a user to select a respective peripheral device connected to the image processing device 200 to be updated. In one embodiment, the user interface may be a web page displayable in a browser executing on the image processing device. In another embodiment, the user interface may be selectively broadcast to an external computing device (e.g. laptop, desktop, smartphone or tablet computing device) which allows a user of the external computing device to interact with and control operation of the update application 402.

In another embodiment, the update application 402 may include update distribution functionality such that a single image processing device 200 executing the update application 402 may selectively identify other image processing devices as update candidate devices to which a particular software update may be pushed to an initiate updating of any peripheral devices connected to the candidate image processing devices. Thus, the user can update or manage other card readers which are attached to other image processing devices in the same application web page of the same image processing device via different communication protocols. In another words, this functionality turns a first image processing device 200 into a master device and any other image processing devices to which the computing device is not directly coupled to but which are on the same communication network into slaves devices. The user can update or manage all the needed card readers through master device using communication protocols such as SOAP, RESTful API or any other data distribution mechanism.

In one exemplary embodiment, the update application 402 executing on the image processing device 200 provides services to initiate update processing on other image processing devices that are also executing a respective instance of the update application 402 thereon. In addition to the software update file (e.g. firmware file) data representing a list of other image processing devices may be provided to the update application 402. This data may include at least one of (a) device ID; (b) device address and/or (c) other device specific identification data that enables identification and communication between image processing devices. The update application 402 then loops through the list and, for each device (second device is used to refer each device), the update application first checks if the update service is available or not. If the update service via the update application 402 is not available, that second device will be skipped. If the update service via the update application 402 is available, the update application 402 executing on the master image processing device will check the peripheral device connected to that second device to determine if that peripheral device is a candidate device for update. The checking/validation process is done by calling a specific service that is provided by the update application 402 installed in second device. After the validation is passed, it sends the firmware file to second device and request to perform an update on second device's card reader. The firmware file is sent blocks by blocks depends on the receiver's capability. If the peripheral device is does not match the peripheral device for which the update is intended, that second image processing device will be skipped and the update application 402 executing on the master image processing device will proceed to a next second image processing device.

In the event that the second device is identified as a candidate device for update, and as soon as the second device receive all the data, the update application 402 executing on the second device switches the communication mode of the peripheral to the update communication mode (e.g. CCID mode in the case where the peripheral is a card reader device) and begins to apply the updates to peripheral device using device type protocol (e.g. CCID protocol). After the update process is done, the update application 402 of second device restarts the peripheral device to complete the process. The update application 402 of second device keeps polling the card reader to identify if update is successful or not. (This polling can be either firmware version or other parameters depends on the architecture of the card reader). As soon as the successful update status is confirmed, the update application 402 of second device sends back response message to the update application executing on the master image processing device 200. The process can be done either in parallel or sequentially. By using parallel, the distributing device sends requests simultaneously to multiple devices and wait for their responses. As soon as the distributing device receives response from all the devices, update process is done. By using sequential, the distributing device then checks if there is more devices in the list or not. If yes, it sends another update request. Otherwise, update process is done. An algorithm detailing the above described features is shown in FIG. 8 and a software sequence diagram representing the same is shown in FIG. 9.

Figure 8:
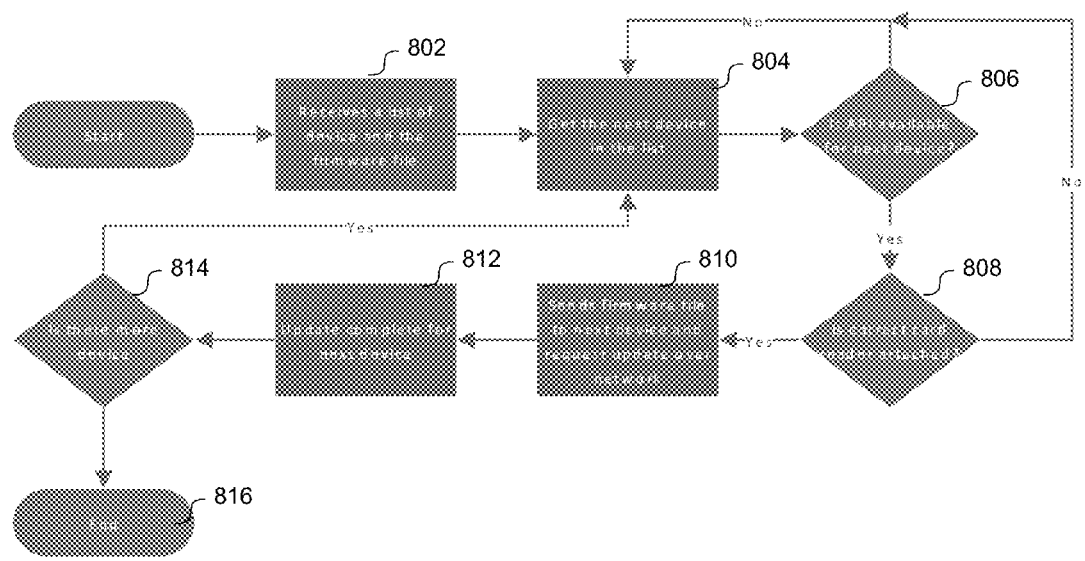
FIG. 8 is a flow diagram detailing further operation of the system according to invention principles.
Figure 9:
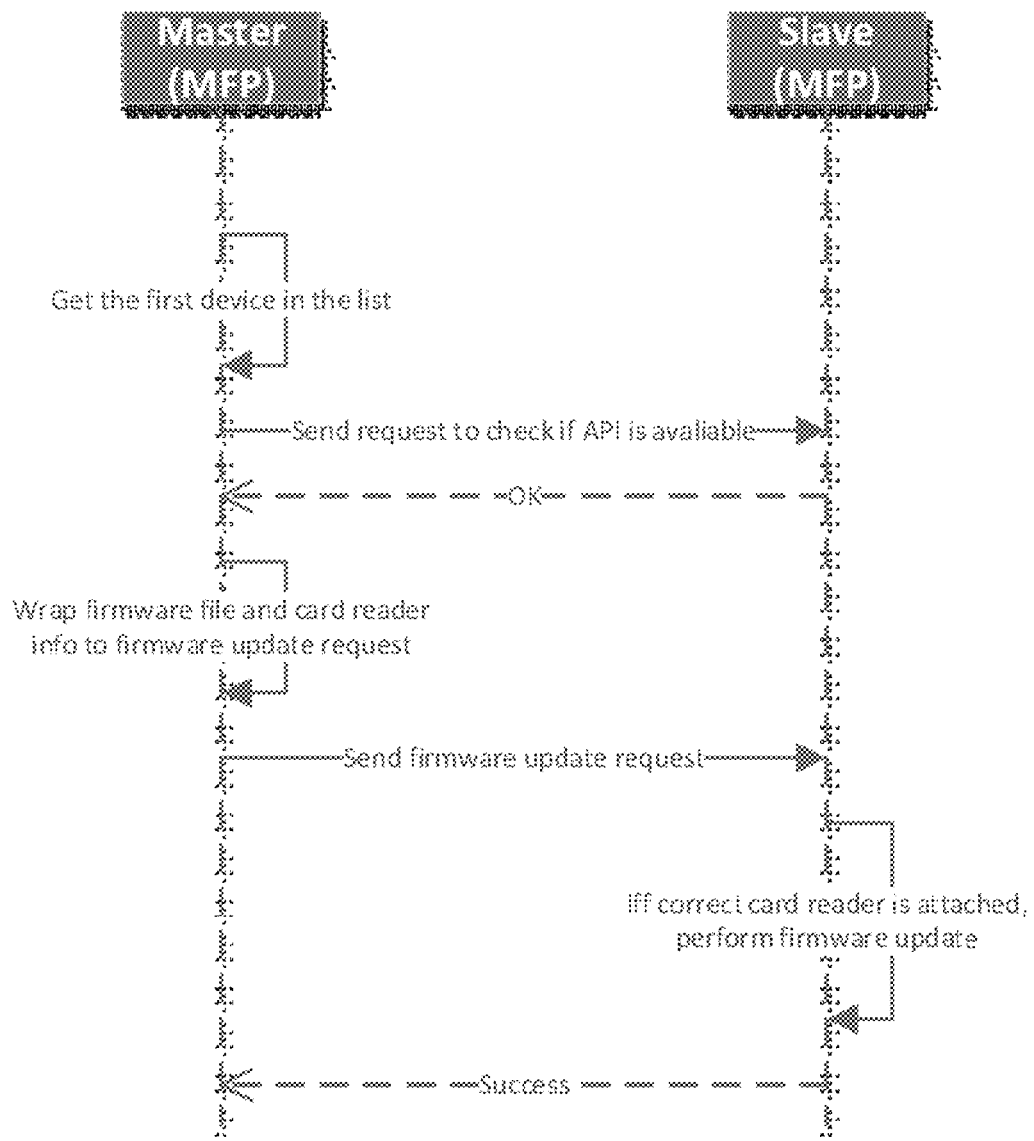
FIG. 9 is a sequence diagram further illustrating the steps described in the flow diagram of FIG. 8.

Turning to FIG. 8, in step 802, the update application 402 receives a list of devices to be updated and a data object representing one of a software update and/or configuration update to be applied to a peripheral device connected to one of the devices on the list. The update application 402 performing these operations designates itself a master device and designates each device on this list of devices as a slave device. In one embodiment, the information in step 802 is received from a user who accesses a user interface via a web page broadcast by the update application 402 executing on the image processing device 200. In this embodiment, a user manually selects (or adds) information identifying image processing devices on a network that have peripheral devices connected thereto which require updating. The data object representing the software update may then be uploaded to the update application 402 along with the device identification information.

In another embodiment, step 802 may be performed automatically by the update application 402 which may selectively query the network to identify information about other image processing devices on the network that have peripheral devices connected thereto which may need updating. In this embodiment, the result of the network query returns device identification information and device address information identifying a network location at which the particular image processing device is located. The device information may include information describing the particular device as well as information identifying any peripheral currently connected to the particular image processing device. This information may be received by the update application 402 to create an update distribution list to which data representing software update for the peripheral device is to be distributed. In one embodiment, the update application 402, when querying the network, can determine if a corresponding update application 402 is installed on a particular device located on the network and, if not, it can replicate itself and install itself on any image processing device 200 that does not currently have an update application 402 executing thereon.

In a further embodiment, the operations described in step 802 may be performed automatically by the update application 402 at a predetermined time such as, upon receipt of data representing a software update from a source of update information (e.g. provided by a user or acquired from a data store connected to the image processing device such as a flash memory drive or remotely located data store, the address of which is provided by a user or preconfigured as part of the update application 402.

Returning to the operation in FIG. 8, the update application begins the fleet update operation in step 804 where it parses the list of device information and determines, in step 806, if an update application API is available for the device. If the result is negative, the flow returns to step 804 to identify a next device on the list. Alternatively, if the result of the query in step 806 is negative, the update application 402 may automatically replicate itself and install an update application on the particular image processing device determined not to currently have the update application API installed. In another embodiment, a negative determination in step 806 may also cause the update application 402 to instruct the image processing device determined not to have the update application to install the update application from a predetermined installation location.

However, if the determination in step 806 is positive, the update application 402 determines, in step 808, if a peripheral attached to the image processing device is the correct peripheral requiring a software update. If the result is negative, the flow reverts back to step 804 to obtain information about a next image processing device on the list. If the result in step 808 is positive, the update application 402 designates the update application executing on the slave device as a slave update application and packages the data representing the software update and communicates the data representing the software update to the slave update application executing on the slave image processing device and initiates an update request in step 810. The update request is executed by the slave update application in step 810 includes performing operations, by the slave update application, described above with respect to FIGS. 4, 6 and 7 which are incorporated herein by reference in their entirety. In step 812, the master update application 402 receives information from the slave update application indicating that the update has been successful and determines, in step 814, whether more devices exist and require update. If the there are other devices that need updating, the update application reverts to step 804. If no other devices require update, then the update application 402 ends operation in step 816.

FIG. 9 represents a sequence diagram including the operations described in FIG. 8 and illustrates the instances where there is an available update application API and a peripheral connected thereto that is to be updated. FIG. 9. Begins with step 804 of FIG. 8 whereby the master update application parse the list of other image processing devices that are present on the network otherwise known as candidate slave image processing devices. For the first device on the list, the master update application issues a request to check if an API for a corresponding update application is present on a first candidate slave image processing device. The candidate slave sends back a positive response to the request and is identified as a slave image processing device that includes a slave update application.

The master update application, in response to receiving the confirmation that the slave update application is present, generates a data object representing the software update to be applied to the peripheral device coupled to the slave image processing device by wrapping the software update file and peripheral information into a peripheral update request. The peripheral update request is formatted for network communication and sent to the slave update application executing on the slave image processing device. The slave update application parses the request to ensure that the correct peripheral is connected and performs the update of the peripheral. An exemplary manner in which this update is performed is described herein as well as in FIGS. 4, 6 and 7. For example, the slave update application may query the communication modes of the slave peripheral and switch the communication mode to an update communication mode. In one embodiment, the slave update application switches the communication mode of the slave peripheral to be a to CCID mode communicates with card reader to perform peripheral software update using CCID mode. Once the update is complete, the slave update application restarts the card reader and polls the slave peripheral to get a version of firmware executing thereon to confirm successful update. The slave peripheral device returns the version of firmware to slave update application after restart indicating that the firmware update for slave peripheral coupled to the slave image processing device is completed.

The update application executing on an image processing device advantageously reduces the effort and device downtime associated with updating a peripheral device connected thereto by enabling the peripheral device to remain connected to the image processing device and performing a software update on the peripheral device using a previously disabled communication mode of the peripheral device. Additionally, the update application improves device operation by converting a single image processing device 200 into a master device that can identify and distribute software update to a plurality of other network connected image processing devices thereby reducing the time needed to ensure that peripherals connected to each of the plurality of image processing devices are up to date and have capabilities.

Various above-described operations performed by the image processing device 200 may be executed and/or controlled by one or more applications running on the image processing device 200. The above description serves to explain principles of the invention; but the invention should not be limited to the examples described above. For example, the order and/or timing of some of the various operations may vary from the examples given above without departing from the scope of the invention. Further by way of example, the type of network and/or computing systems may vary from the examples given above without departing from the scope of the invention. Other variations from the above-recited examples may also exist without departing from the scope of the invention.

The scope of the present invention includes a computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments.

We claim:

1. An image processing device comprising:
   at least one peripheral device, connected to the image processing device and including software executing thereon that controls one or more functions of the at least one peripheral device;
   a processor; and
   a memory storing a set of instructions that, when executed by the processor, controls the image processing device to:
   receive a data object representing an update to be applied to the software executing on the at least one peripheral device connected to the image processing device;
   generate a communication mode switch message to change, on the at least one peripheral device, a mode of communicating data between the at least one peripheral device and the image processing device;
   communicate the communication mode switch message to the at least one peripheral device;
   disable, on the at least one peripheral device, a currently active communication mode that uses a first communication pathway that enables communication between the image processing device and the at least one peripheral device;
   activate, on the at least one peripheral device, a second communication pathway that was previously disabled during the active communication mode as an update mode enabling the image processing device to communicate with the at least one peripheral via the second communication pathway; and
   transmit the data object representing the update via the update mode to apply the update to the software executing on the at least one peripheral device.

2. The image processing device according to claim 1, wherein execution of the instructions stored in memory further controls the image processing device to:
   determine a type of communication mode currently set as active and which is used to communicate data between the at least one peripheral device and image processing device; and
   generate the communication mode switch message when it is determined that currently set communication mode is not of a type able to communicate data representing a software update to the at least one peripheral device.

3. The image processing device according to claim 1, wherein execution of the instructions stored in memory further controls the image processing device to:
   determine, from the at least one peripheral, types of communication modes available in the at least one peripheral and an activity status of the types of communication modes; and
   select, as an update mode, a type of communication mode determined to be available but inactive and able to receive data representing the software update; and
   generate the communication mode switch message to switch to the selected type of communication mode.

4. The image processing device according to claim 1, wherein execution of the instructions stored in memory further controls the image processing device to:
   convert the received data object representing the software update into a format corresponding to a format suitable for transmission to the at least one peripheral device to apply the update.

5. The image processing device according to claim 1, wherein execution of the instructions stored in memory further controls the image processing device to:

generate an update message indicating that an update to software executing on the at least one peripheral device is to be updated, the update message indicating a type of format that the data representing the software update will be received;

controlling the at least one peripheral to enter an update mode to apply the update based on the type of format.

6. The image processing device according to claim 1, wherein execution of the instructions stored in memory further controls the image processing device to:

generate a user interface including a plurality of user selectable image elements that enable a user to at least one of (a) upload, to the image processing device, the software update; (b) select a respective one of the at least one peripheral device connected to the image processing device to be updated;

providing the generated user interface to an external computing device.

7. The image processing device according to claim 1, wherein execution of the instructions stored in memory further controls the image processing device to:

search a network that the image processing device is connected to for one or more other image processing device;

obtain from each of the one or more other image processing device on the network, information including address information identifying an address on the network and peripheral information identifying one or more peripheral devices connected to each of the one or more other image processing device;

generate an update list including the information associated with each of the one or more other image processing device;

transmitting the data object representing the software update to each of the one or more image processing devices to update the one or more peripheral devices connected thereto.

8. The image processing device according to claim 1, wherein execution of the instructions stored in memory further controls the image processing device to:

search a network that the image processing device is connected to for one or more other image processing device that includes at least one peripheral device connected thereto and having software executing thereon that controls one or more functions of the at least one peripheral device;

obtain from each of the one or more other image processing device on the network, information indicating a presence of a predetermined type of application executing on each of the one or more image processing device; and in response to determining that the predetermined type of application is present, designating the predetermined type of application as a slave application, and in response to determining that the predetermined type of application is not present, causing the predetermined type of application to be installed thereon.

9. The image processing device according to claim 8, wherein execution of the instructions stored in memory further controls the image processing device to:

transmit to the slave application executing on each of the one or more image other image processing devices, the data object representing the update to the software executing on the at least one peripheral device; and controlling, each of the one or more image processing devices having the slave application executing thereon as a slave image processing device to update the software executing on the at least one peripheral device connected to the slave image processing device by:

generating a communication mode switch message to change, on the at least one peripheral device connected to the slave image processing device, a mode of communicating data between the at least one peripheral device and the slave image processing device;

communicating the communication mode switch message to the at least one peripheral device connected to the slave image processing device;

disabling, on the at least one peripheral device connected to the slave image processing device, a currently active communication mode that uses a first communication pathway that enables communication between the slave image processing device and the at least one peripheral device connected to the slave image processing device;

activating, on the at least one peripheral device connected to the slave image processing device, a second communication pathway that was previously disabled during the active communication mode as an update mode; and transmitting the data object representing the update via the update mode to apply the update to the software executing on the at least one peripheral device connected to the slave image processing device.

10. The image processing device according to claim 1, wherein the at least one peripheral is an card reader device configured to read data from a card associated with a user which is used to authenticate a user to access one or more resources on the image processing device.

11. A method, performed by an image processing device, of updating software executing on a peripheral device connected to the image processing device comprising:

receiving, and storing in memory of the image processing device, a data object representing an update to be applied to the software executing on the peripheral device connected to the image processing device;

generating a communication mode switch message to change, on the peripheral device, a mode of communicating data between the peripheral device and the image processing device;

communicating the communication mode switch message to the peripheral device;

disabling, on the peripheral device, a currently active communication mode that uses a first communication pathway that enables communication between the image processing device and the peripheral;

activating, on the peripheral device, a second communication pathway that was previously disabled during the active communication mode as an update mode; and transmitting the data object representing the update via the update mode to apply the update to the software executing on the peripheral device.

12. The method according to claim 11, further comprising determining a type of communication mode currently set as active and which is used to communicate data between the peripheral device and image processing device; and generating the communication mode switch message when it is determined that currently set communication mode is not of a type able to communicate data representing a software update to the peripheral device.

13. The method according to claim 11, further comprising
determining, from the peripheral device, types of communication modes available in the peripheral and an activity status of the types of communication modes; and
selecting, as the update mode, a type of communication mode determined to be available but inactive and able to receive data representing the software update; and
generating the communication mode switch message to switch to the selected type of communication mode.

14. The method according to claim 11, further comprising converting the received data object representing the software update into a format corresponding to a format suitable for transmission to the at least one peripheral device to apply the update.

15. The method according to claim 11, further comprising
generating an update message indicating that an update to software executing on the peripheral device is to be updated, the update message indicating a type of format that the data representing the software update will be received;
controlling the peripheral to enter an update mode to apply the update based on the type of format.

16. The method according to claim 11, wherein the image processing device includes a plurality of peripheral devices connected thereto, and further comprising
generating a user interface including a plurality of user selectable image elements that enable a user to at least one of (a) upload, to the image processing device, the software update; (b) select a respective one of the plurality of peripheral devices connected to the image processing device to be updated;
providing the generated user interface to an external computing device.

17. The method according to claim 11, further comprising
searching a network that the image processing device is connected to for one or more other image processing device;
obtaining from each of the one or more other image processing device on the network, information including address information identifying an address on the network and peripheral information identifying one or more peripheral devices connected to each of the one or more other image processing device;
generating an update list including the information associated with each of the one or more other image processing device;
transmitting the data object representing the software update to each of the one or more image processing devices to update the one or more peripheral devices connected thereto.

18. The method according to claim 11, further comprising
searching a network that the image processing device is connected to for one or more other image processing device including a peripheral device connected thereto, having software executing thereon that controls one or more operations of the peripheral device;
obtaining from each of the one or more other image processing device on the network, information indicating a presence of a predetermined type of application executing on each of the one or more image processing device; and
in response to determining that the predetermined type of application is present, designating the predetermined type of application as a slave application, and
in response to determining that the predetermined type of application is not present, causing the predetermined type of application to be installed thereon.

19. The method according to claim 18, further comprising
transmitting to the slave application executing on each of the one or more image processing device, the data object representing the update to the software executing on the peripheral device; and
controlling the slave application executing on each of the one or more image processing device as a slave image processing device to update the software executing on the peripheral device connected to the slave image processing device by:
generating a communication mode switch message to change on the peripheral device, a mode of communicating data between the peripheral device and the slave image processing device;
communicating the communication mode switch message to the peripheral device connected to the slave image processing device;
disabling, on the peripheral device connected to the slave image processing device, a currently active communication mode that uses a first communication pathway that enables communication between the slave image processing device and the peripheral device connected to the slave image processing device;
activating, on the peripheral device connected to the slave image processing device, a second communication pathway that was previously disabled during the active communication mode as an update mode; and
transmitting the data object representing the update via the update mode to apply the update to the software executing on the at least one peripheral device connected to the slave image processing device.

20. The method according to claim 11, wherein the peripheral is a card reader device configured to read data from a card associated with a user which is used to authenticate a user to access one or more resources on the image processing device.

21. A non-transitory computer readable storage medium that stores instructions that, when executed by a processor, control an image processing device to execute a method of updating software executing on a peripheral device connected to the image processing device, the updating method comprising:
receiving, and storing in memory of the image processing device, a data object representing an update to be applied to the software executing on the peripheral device connected to the image processing device;
generating a communication mode switch message to change, on the peripheral device, a mode of communicating data between the peripheral device and the image processing device;
communicating the communication mode switch message to the peripheral device;
disabling, on the peripheral device, a currently active communication mode that uses a first communication pathway that enables communication between the image processing device and the peripheral device;
activating, on the peripheral device, a second communication pathway that was previously disabled during the active communication mode as an update mode; and
transmitting the data object representing the update via the update mode to apply the update to the software executing on the peripheral device.

* * * * *